(12) United States Patent
Terashima et al.

(10) Patent No.: US 9,383,543 B2
(45) Date of Patent: Jul. 5, 2016

(54) LENS CONTROL DEVICE AND LENS CONTROL METHOD

(71) Applicant: FUJIFILM Corporation, Tokyo (JP)

(72) Inventors: Masayuki Terashima, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 14/030,283

(22) Filed: Sep. 18, 2013

(65) Prior Publication Data
US 2014/0016193 A1 Jan. 16, 2014

Related U.S. Application Data

(63) Continuation of application No. PCT/JP2012/056919, filed on Mar. 16, 2012.

(30) Foreign Application Priority Data

Mar. 18, 2011 (JP) .................... 2011-061457

(51) Int. Cl.
| | |
|---|---|
| *G02B 27/22* | (2006.01) |
| *G02B 7/10* | (2006.01) |
| *H04N 5/232* | (2006.01) |
| *H04N 13/02* | (2006.01) |
| *G03B 35/08* | (2006.01) |

(52) U.S. Cl.
CPC ............... *G02B 7/102* (2013.01); *G03B 35/08* (2013.01); *H04N 5/23296* (2013.01); *H04N 13/0239* (2013.01); *H04N 13/0296* (2013.01); *G03B 2205/0046* (2013.01); *G03B 2206/00* (2013.01)

(58) Field of Classification Search
CPC ............... G02B 27/2214; G02B 27/22; G02B 27/2228; G02B 27/2264; G02B 26/008; G02B 27/2207; G02B 27/225; G02B 27/2292; G02B 27/2235; G02B 27/26; G02B 27/2221; G02B 27/24; G02B 3/0056; G02B 17/023; G02B 23/2415; G02B 26/02
See application file for complete search history.

(56) References Cited

U.S. PATENT DOCUMENTS

| | | | |
|---|---|---|---|
| 5,864,360 A | 1/1999 | Okauchi et al. | |
| 8,750,698 B2 * | 6/2014 | Terashima ..................... | 396/87 |

(Continued)

FOREIGN PATENT DOCUMENTS

| | | |
|---|---|---|
| JP | 01-268297 | 10/1989 |
| JP | 08-251626 | 9/1996 |

(Continued)

OTHER PUBLICATIONS

STIC Search Report 14030283.*

(Continued)

*Primary Examiner* — James Greece
*Assistant Examiner* — Sharrief Broome
(74) *Attorney, Agent, or Firm* — Young & Thompson

(57) ABSTRACT

A lens control device incorporated in a lens device 10A is equipped with a first zoom position sending unit for sending a zoom position signal indicating a zoom position of the first lens device 10A to a lens device 10B; a second zoom position sending unit for sending an adjusted zoom position signal for zoom position adjustment of the lens device 10B to the lens device 10B; a zoom storage unit for storing zoom adjustment information in which a zoom position adjustment amount indicated by the adjusted zoom position signal is correlated with the zoom position of the lens device 10A; and a third zoom position sending unit for sending a zoom position signal for the lens device 10B on the basis of the zoom adjustment information in response to a zoom manipulation signal indicating a zoom manipulation on the lens device 10A.

16 Claims, 6 Drawing Sheets

(56) References Cited

U.S. PATENT DOCUMENTS

| | | | |
|---|---|---|---|
| 2005/0046966 A1* | 3/2005 | Okawara | G02B 7/102 359/696 |
| 2008/0158346 A1 | 7/2008 | Okamoto et al. | |
| 2011/0001847 A1 | 1/2011 | Iwasaki | |
| 2011/0012997 A1 | 1/2011 | Koguchi | |
| 2011/0018970 A1 | 1/2011 | Wakabayashi | |

FOREIGN PATENT DOCUMENTS

| | | | | |
|---|---|---|---|---|
| JP | 08251626 A | * | 9/1996 | H04N 13/02 |
| JP | 09-127400 | | 5/1997 | |
| JP | 09-187039 | | 7/1997 | |
| JP | 09187039 A | * | 7/1997 | H04N 13/02 |
| JP | 11-027702 | | 1/1999 | |
| JP | 2010-103949 | | 5/2010 | |
| JP | 2010-237582 | | 10/2010 | |
| JP | 2010237582 A | * | 10/2010 | |

OTHER PUBLICATIONS

International Search Report, PCT/JP2012/056919, May 29, 2012.
Written Opinion, PCT/ISA/237, mailed May 29, 2012.
Extended European search report, dated Dec. 3, 2014, in corresponding European Patent Application No. 12760645.7.
Chinese Official Action—201280014142.2—May 5, 2015.

* cited by examiner

LENS CONTROL DEVICE AND LENS CONTROL METHOD

CROSS REFERENCE TO RELATED APPLICATION

This is a continuation of International Application No. PCT/JP2012/056919 filed on Mar. 16, 2012, and claims priority from Japanese Patent Application No. 2011-061457 filed on Mar. 18, 2011, the entire disclosures of which are incorporated herein by reference.

TECHNICAL FIELD

The present invention relates to a lens control device which is incorporated in a lens device for 3D image taking and a lens control method of this lens control device.

BACKGROUND ART

Camera systems have been proposed which take a 3D image by taking right-eye and left-eye parallax images using two lens devices disposed in parallel. The two lens devices used in such camera systems are driven simultaneously so that sets of optical conditions which are varied by a focusing control, a zooming control, an iris control, etc. are always kept identical. In general, the right-eye and left-eye lens devices of such camera systems are completely identical in terms of the shooting lens specification (the shooting lenses are of the same kind).

That is, to take a 3D image, it is necessary to prepare two completely identical lens devices. Even if a user owns plural lens devices, the lens devices cannot be used for taking of a 3D image as they are.

In this connection, the 3D shooting system disclosed in Patent document 1 is known as a camera system which uses various lens devices for 3D and equalizes zoom positions (focal lengths).

PRIOR ART DOCUMENTS

Patent Documents

Patent document 1: JP-A-11-027702

SUMMARY OF THE INVENTION

Problems to be Solved by the Invention

As described above, when a user wants to take a 3D image, he or she prepares two (left and right) lens devices. When it is attempted to take a 3D image by combining a lens device that is designed for 3D image taking with an arbitrary, existing lens device of a different kind, a camera system cannot make adjustments between lens devices in advance because what kind of existing lens device will be connected is unknown.

In the 3D shooting system disclosed in Patent document 1, to equalize zoom positions between lens devices are equalized, it is necessary to use correction circuits separately from the lens devices and connect the lens devices to the respective correction circuits. This results in a complex configuration.

The present invention has been made in the above circumstances, and an object of the invention is therefore to make it possible to take a 3D image easily with zoom positions equalized even in the case where a lens device that is designed for 3D image taking is combined with any of various existing lens devices that are of different kinds than it.

Means for Solving the Problems

A lens control device which is incorporated in a first lens device for 3D image taking and controls the first lens device and a second lens device which is made usable for 3D image taking when connected to the first lens device, comprising a first zoom position sending unit for sending a zoom position signal indicating a zoom position of the first lens device to the second lens device; a second zoom position sending unit for sending an adjusted zoom position signal for zoom position adjustment of the second lens device to the second lens device; a zoom storage unit for storing zoom adjustment information in which a zoom position adjustment amount indicated by the adjusted zoom position signal is correlated with the zoom position of the first lens device; and a third zoom position sending unit for sending a zoom position signal for the second lens device on the basis of the zoom adjustment information in response to a zoom manipulation signal indicating a zoom manipulation on the first lens device.

A lens control method of a lens control device incorporated in a first lens device for 3D image taking, for controlling the first lens device and a second lens device which is made usable for 3D image taking when connected to the first lens device, comprising sending a zoom position signal indicating a zoom position of the first lens device to the second lens device; sending an adjusted zoom position signal for zoom position adjustment of the second lens device to the second lens device; storing zoom adjustment information in which a zoom position adjustment amount indicated by the adjusted zoom position signal is correlated with the zoom position of the first lens device; and sending a zoom position signal for the second lens device on the basis of the zoom adjustment information in response to a zoom manipulation signal indicating a zoom manipulation on the first lens device.

Advantages of the Invention

In the invention, the state of any of various existing lens devices that are of different kinds than a lens device that is designed for 3D image taking is adjusted to a state of the latter. This makes it possible to take a 3D image with zoom positions equalized even in the case where a lens device that is designed for 3D image taking is combined with any of various existing lens devices that are of different kinds than it.

MODES FOR CARRYING OUT THE INVENTION

An embodiment of the present invention will be hereinafter described with reference to the drawings.

Figure 1:
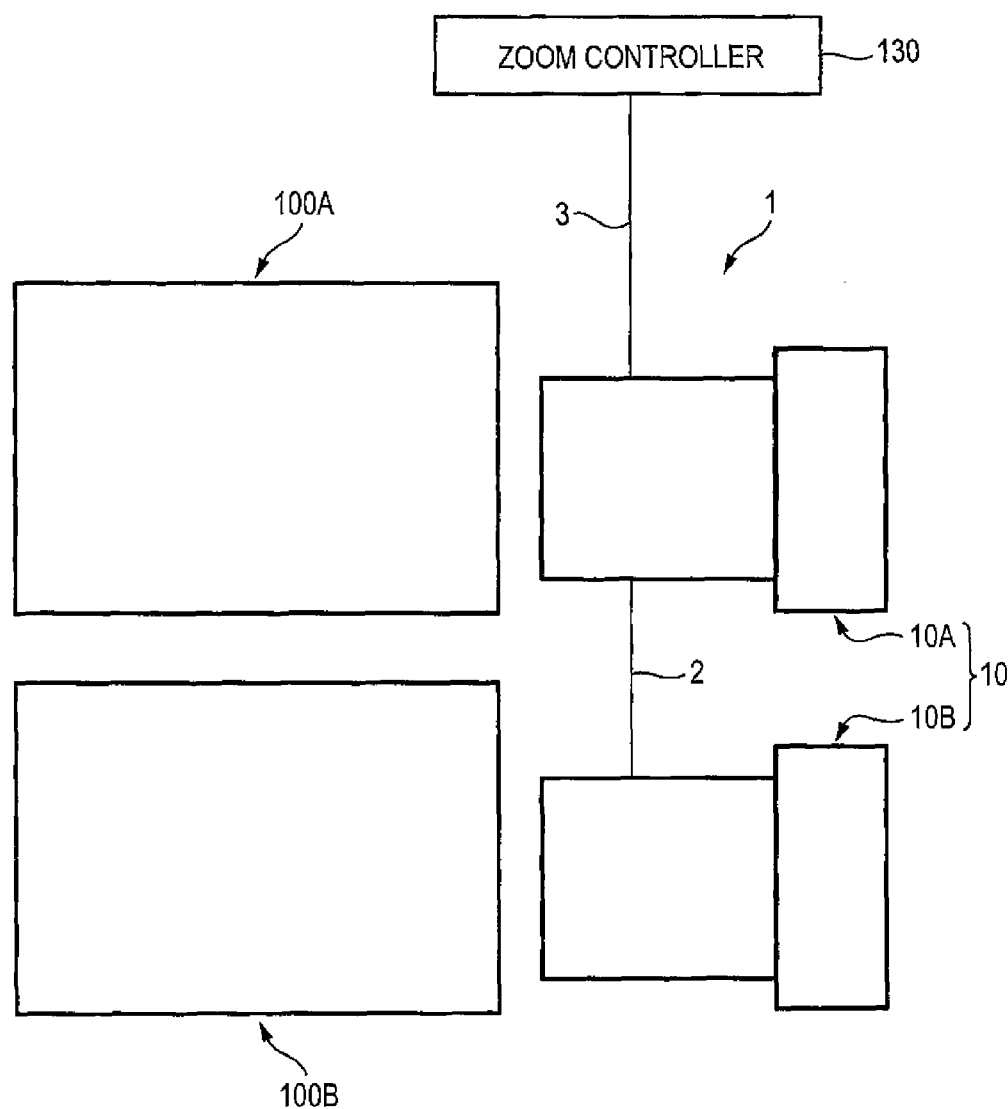
FIG. 1 is a drawing for description of an embodiment of the present invention which shows a general configuration of a camera system.

FIG. 1 is a block diagram for description of the embodiment of the invention which shows the overall configuration of a camera system.

As shown in FIG. 1, the camera system 1 is configured so as to include camera main bodies 100A and 100B, a 3D camera lens system 10, and a zoom controller 130. The camera system 1 is mainly used for taking of a 3D image.

The lens system 10 includes two lens devices 10A and 10B. The lens devices 10A and 10B are mounted on the camera main bodies 100A and 100B, respectively. For example, the lens devices 10A and 10B are used for taking left-eye video and right-eye video, respectively.

In the lens system 10, the two lens devices 10A and 10B are connected to each other by a connection cable 2 which functions as a communication means.

The camera main body 100A incorporates an imaging device such as a CCD imaging device, a prescribed signal processing circuit, etc. (not shown). An image formed by the lens device 10A is photoelectrically converted by the imaging device, subjected to prescribed signal processing by the signal processing circuit, and output to the outside from, for example, a video signal output terminal of the camera main body 100A in the form of a video signal of the HDTV scheme (HDTV signal).

Likewise, the camera main body 100B incorporates an imaging device such as a CCD imaging device, a prescribed signal processing circuit, etc. An image formed by the lens device 10B is photoelectrically converted by the imaging device, subjected to prescribed signal processing by the signal processing circuit, and output to the outside from, for example, a video signal output terminal of the camera main body 100B in the form of a video signal of the HDTV scheme (HDTV signal).

The zoom controller 130 and the lens device 10A are connected to each other by a connection cable 3 which functions as a communication means. A zoom manipulation signal for changing the zoom position of the lens device 10A is output and sent from the zoom controller 130.

Figure 2:
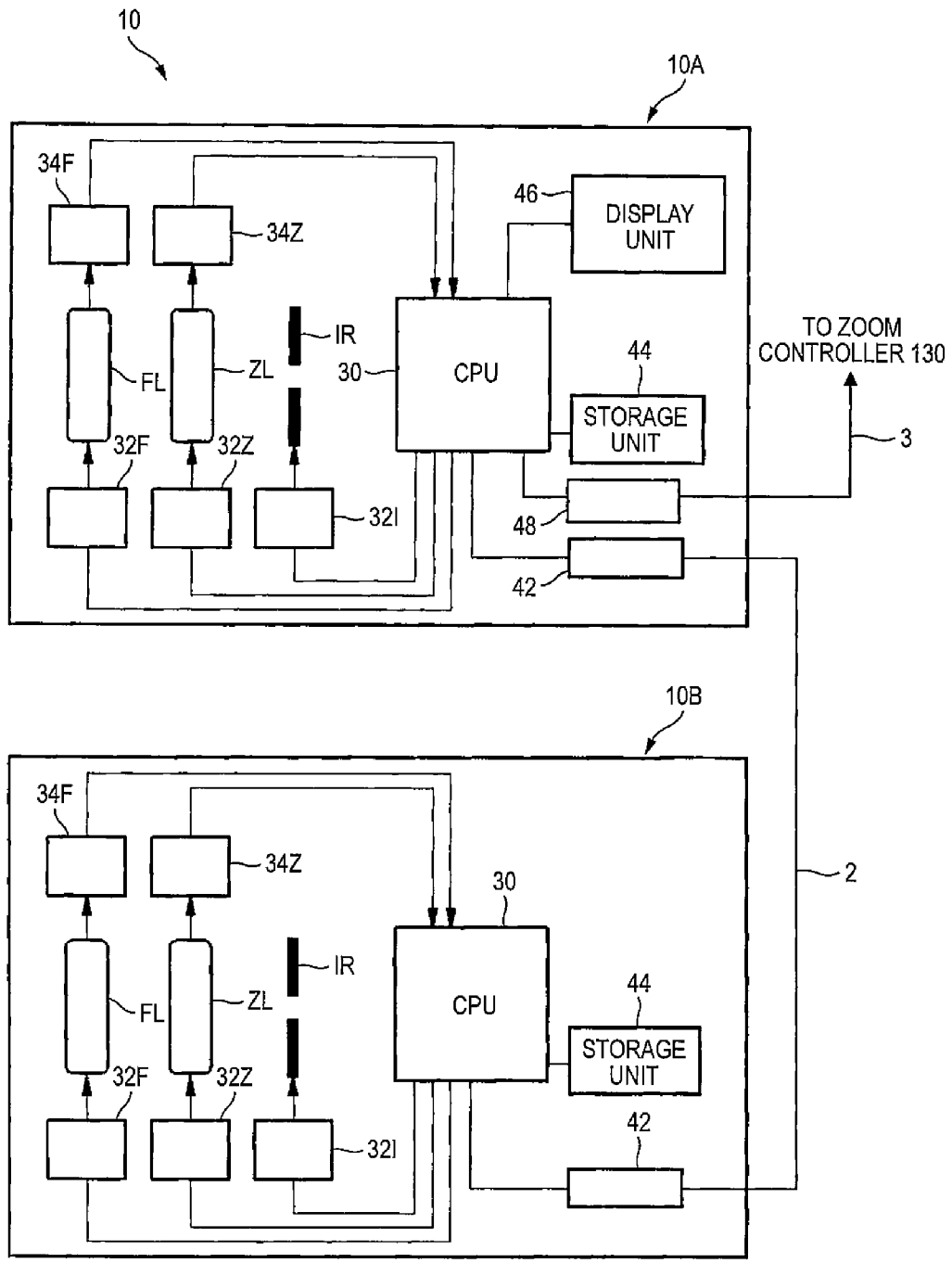
FIG. 2 is a drawing for description of a lens system of the camera system shown in FIG. 1.

FIG. 2 is a drawing for description of the lens system of the camera system shown in FIG. 1.

As shown in FIG. 2, each of the lens devices 10A and 10B of the lens system 10 is composed of an optical system (shooting lens) and a control system (control unit). The lens device 10A is a lens device designed for taking of a solid image. On the other hand, the lens device 10B is an existing lens device that is of a different kind than the lens device 10A, and can be used for 3D image taking only when connected to the lens device 10A by the connection cable 2. Although the figure shows the lens device 10B as an example, an arbitrary lens device can be used as long as it can send and receive information to and from the lens device 10A. For convenience of description, elements having the same function are given the same symbol. In the following, the elements of the lens device 10A will mainly be described. And elements of the lens device 10B for which corresponding ones having the same functions exist in the lens device 10A are regarded as identical to the latter and will not be described where appropriate.

In the optical system (shooting lens) of the lens device 10A, optical components such as a focus lens group FL, a zoom lens group ZL, an iris IR, and a master lens group (not shown) are provided inside a lens barrel. The focus lens group FL and the zoom lens group ZL are disposed so as to be able to move in the front-rear direction along the optical axis. A focus adjustment (subject distance adjustment) is performed by mainly adjusting the position of the focus lens group FL, and a zoom adjustment (focal length adjustment) is performed by mainly adjusting the position of the zoom lens group ZL. A light quantity adjustment is performed by adjusting the position of the iris IR (degree of opening).

The control system of the lens device 10A is equipped with a CPU 30 which controls the entire optical system in a unified manner, a focus lens drive unit 32F which supplies drive force for changing the position of the focus lens group FL, a zoom lens drive unit 32Z which supplies drive force for changing the position of the zoom lens group ZL, an iris drive unit 32I which supplies drive force for changing the light quantity using the iris IR. Each drive unit is equipped with a drive motor (not shown) and an amplifier (not shown) which supplies drive power to the drive motor.

A function to be performed in a zoom adjustment setting mode or a zoom linkage control of a 3D image operation mode (described later) is realized by running, mainly by the CPU 30 of the lens device 10A, a program installed in a storage unit 44 of the lens device 10A.

The lens device 10A is equipped with a communication connection unit 42 to which the connection cable 2 is connected, the storage unit 44 such as a memory, a display unit 46, and a communication connection unit 48 to which the connection cable 3 is connected.

The communication connection unit 42 is an interface for connection to another lens device (in this example, the lens device 10B), and may be of a serial communication scheme such as RS-232. The lens device 10A sends and receives information relating to a zoom position to and from another lens device through the communication connection unit 42.

The storage unit 44 stores programs to be run by the CPU 30, identification information (e.g., a type number of the lens device) that is specific to the lens device 10A, and various tables (e.g., a zoom adjustment table (described later)) that are necessary in controlling the lens device 10A and another lens device connected to the lens device 10A. The storage unit 44 also stores a connection list of other lens devices that were connected to the lens device 10A before. The storage unit 44 may also store correction data etc. to be used at the time of reproduction.

The display unit 46 displays information indicating an operation status of focusing, zooming, or another kind of operation, or another kind of status of the lens device 10A. The display unit 46 may be an LCD or an LED display, for example.

The communication connection unit 48 is an interface for connection to another external device (in this example, the zoom controller 130), and may be of a serial communication scheme such as RS-485. The lens device 10A is configured so as to send and receive information relating to a zoom manipulation to and from the zoom controller 130 through the communication connection unit 48. The communication connection unit 48 may be configured so as to enable connection of a connection cable for connection to yet another external device.

The control system of the lens device 10A is also provided with an encoder 34F which is linked to the focus lens group FL and an encoder 34Z which is linked to the zoom lens group ZL.

The focus lens group FL, the zoom lens group ZL, and the iris IR are driven by the focus lens drive unit 32F, the zoom lens drive unit 32Z, and the iris drive unit 32I, respectively, on the basis of signals supplied from the CPU 30, and thereby controlled to states that conform to target shooting conditions.

Figure 3:
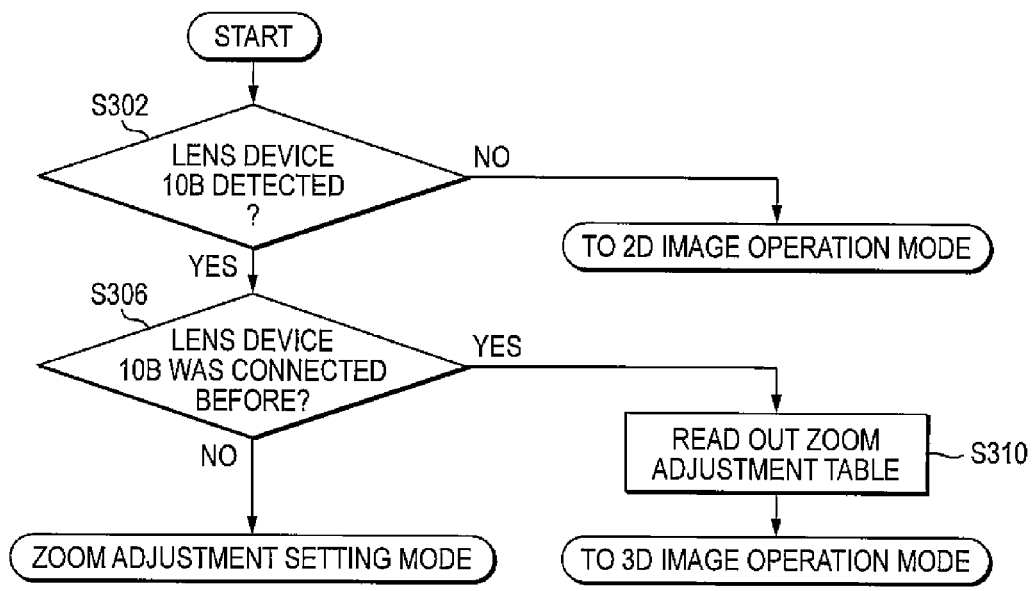
FIG. 3 is a flowchart of a mode setting control which is performed when an existing lens device has been connected to the lens system.

FIG. 3 is a flowchart of a mode setting control which is performed when an existing lens device has been connected to the lens system.

When the lens device 10B has been connected by the connection cable 2, the lens device 10A detects the connection of the lens device 10B (S302).

If the lens device 10B has not been connected and hence is not detected (S302: no), the lens device 10A continues a 2D image operation mode in which a 2D image is taken using only the lens device 10A (the lens device 10B is not used). As a result, in the 2D image operation mode, unlike in a 3D image operation mode (described later), a 2D image can be taken in a zoom movable range of the lens device 10A without being restricted by a zoom movable range of a lens device that is connected to the lens device 10A.

On the other hand, if the lens device 10B has been connected and hence its connection is detected (S302: yes), the lens device 10A receives identification information that is specific to the lens device 10B and judges whether or not the lens device 10B was connected to the lens device 10A before on the basis of the specific identification information by referring to the connection list of lens devices stored in the storage unit 44 (S306).

If judging that the lens device 10B was not connected to the lens device 10A before (S306: no), the lens device 10A makes a transition to a zoom adjustment setting mode (described later; see FIG. 4).

On the other hand, if judging that the lens device 10B was connected to the lens device 10A before (S306: yes), the lens device 10A reads, from the storage unit 44, a zoom adjustment table for the lens device 10A and the lens device 10B (S310).

After execution of S310, initial settings such as reading of various other tables etc. necessary for 3D image taking are performed for the lens device 10A and the lens device 10B and a transition is made to a 3D image operation mode in which to take a 3D image.

Figure 4:
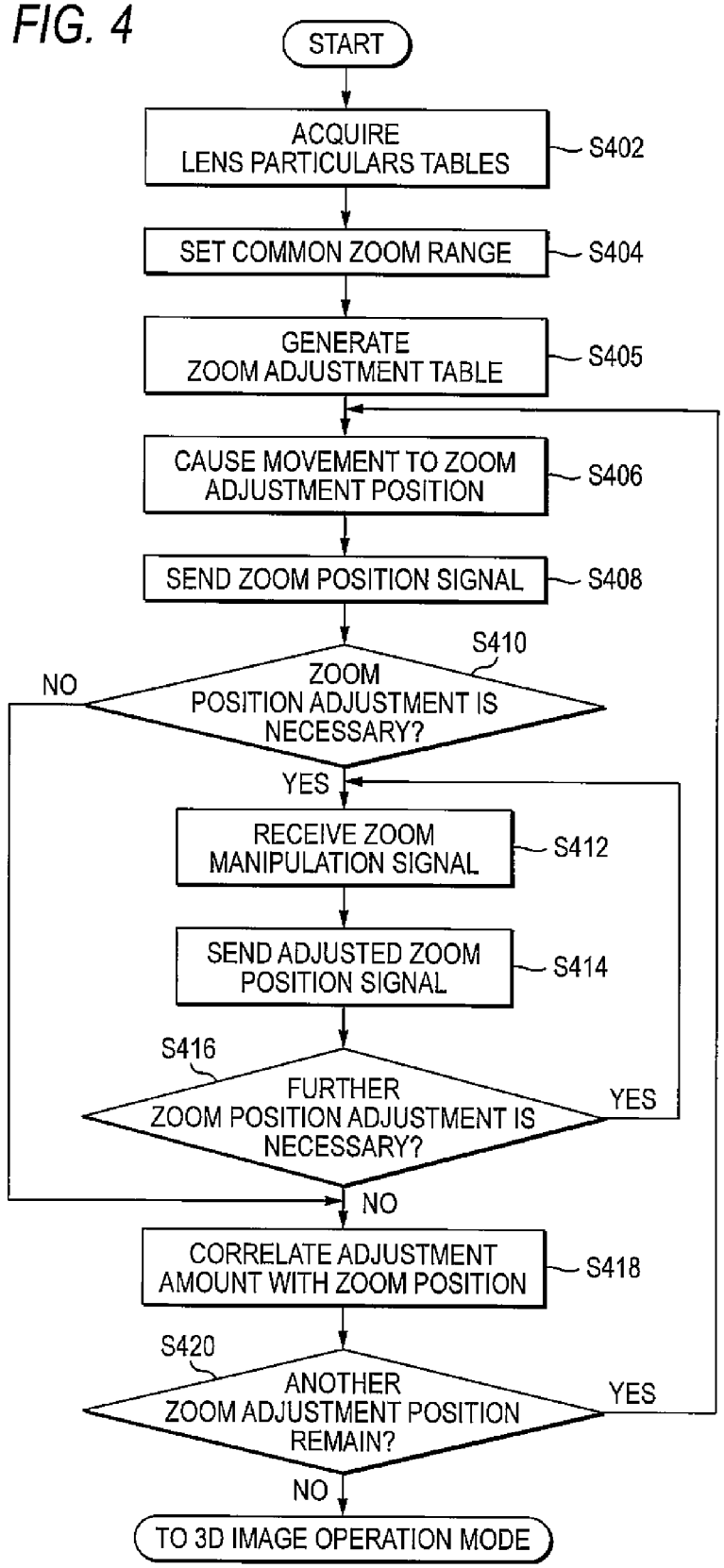
FIG. 4 is a flowchart of a zoom adjustment setting mode.

FIG. 4 is a flowchart of the zoom adjustment setting mode.

First, the lens device 10A acquires lens particulars tables each of which contains a zoom movable range of a lens device (S402). More specifically, the lens device 10A reads a lens particulars table of the lens device 10A from the storage unit 44. Furthermore, the lens device 10A receives a lens particulars table of the lens device 10B via the connection cable 2.

Then, the lens device 10A sets a common zoom range by referring to the lens particulars tables of the respective lens devices (S404). More specifically, the lens device 10A acquires a focal length corresponding to a zoom position that is closest to the wide-angle-side end of the lens device 10A from the lens particulars table of the lens device 10A and acquires a focal length corresponding to a zoom position that is closest to the wide-angle-side end of the lens device 10B from the lens particulars table of the lens device 10B. The lens device 10A sets, as a lower limit value of a common zoom range, a larger one of the acquired focal lengths of the respective lens devices. And the lens device 10A acquires a focal length corresponding to a zoom position that is closest to the tele-side end of the lens device 10A from the lens particulars table of the lens device 10A and acquires a focal length corresponding to a zoom position that is closest to the tele-side end of the lens device 10B from the lens particulars table of the lens device 10B. The lens device 10A sets, as an upper limit value of the common zoom range, a shorter one of the acquired focal lengths of the respective lens devices. As a result, in the 3D image operation mode, if the zoom movable range of the lens device 10B is narrower than that of the lens device 10A, the zoom movable range of the lens device 10 is restricted.

Then, the lens device 10A generates a zoom adjustment table for the lens device 10B in which the specific identification information of the lens device 10B is correlated with the common zoom range (S405).

Then, the lens device 10A generates a zoom position signal for moving the shooting lens of the lens device 10A to a zoom position corresponding to a prescribed focal length that is included in the common zoom range. Then, the lens device 10A moves its shooting lens (zoom lens group ZL etc.) on the basis of the zoom position signal (S406). Typical examples of the prescribed focal length are the upper limit value and the lower limit value of the common zoom range. However, an arbitrary focal length can be used as long as it is included in the common zoom range and can be realized in the lens device 10A.

Then, the lens device 10A sends, to the lens device 10B, a zoom position signal indicating the same output as the zoom position signal that was used for the operation of its own shooting lens (S408). The shooting lens (zoom lens ZL etc.) of the lens device 10B operates on the basis of the thus-transmitted zoom position signal.

Then, the lens device 10A judges whether or not zoom position adjustment for the lens device 10B is necessary (S410). As for a judgment method, for example, the lens device 10A may inquire of a user through the display unit 46 whether or not zoom position adjustment for the lens device 10B is necessary and judge the necessity of zoom position adjustment when receiving a signal indicating whether or not zoom position adjustment is necessary.

If it is judged that zoom position adjustment for the lens device 10B is not necessary (S410: no), the zoom position signal for the lens device 10A can be applied to the lens device 10B as it is. Therefore, the lens device 10A sets, to 0, a zoom position adjustment amount to be used for adjusting the output indicated by a zoom position signal for the lens device 10B, and stores this zoom position adjustment amount in such a manner that it is correlated with the zoom position (focal length) indicated by the zoom position signal (S418).

On the other hand, if judging that zoom position adjustment for the lens device 10B is necessary (S410: yes), the lens device 10A receives a zoom manipulation signal for adjustment of the zoom position of the lens device 10B which is transmitted from the zoom controller 130 (S412). Alternatively, at S410, the lens device 10A may make a transition to a standby state after sending the zoom position signal to the lens device 10B and judge the necessity of zoom position adjustment on the basis of whether or not a zoom manipulation signal is received within a prescribed time.

Then, the lens device 10A generates a new zoom position signal for the lens device 10B on the basis of the received zoom manipulation signal, and sends it to the lens device 10B as an adjusted zoom position signal (S414). The shooting lens of the lens device 10B operates on the basis of the thus-transmitted adjusted zoom position signal.

Then, the lens device 10A judges whether or not further zoom position adjustment for the lens device 10B is necessary (S416). The same judgment method as employed at S410 (described above) may be employed.

If it is judged that further zoom position adjustment for the lens device 10B is necessary (416: yes), steps S412 and S414 are executed again.

On the other hand, if judging that further zoom position adjustment for the lens device 10B is not necessary (416: no), the lens device 10A employs, as a zoom position adjustment amount, the difference between the output indicated by the adjusted zoom position signal and that indicated by the zoom position signal that was sent at step S408 and stores this zoom position adjustment amount in the zoom adjustment table in such a manner that it is correlated with the zoom position (focal length) indicated by the zoom position signal that was sent at step S408 (S418).

Then, the lens device 10A judges whether or not a zoom position adjustment needs to be performed for the next zoom position (S420). For example, the lens device 10A judges that no further zoom position adjustment is necessary if a focal length corresponding to the next zoom position exceeds the upper limit value of the common zoom range as a result of a repetition of zoom position adjustments which were performed while the focal length was increased gradually by a prescribed length each time starting from a zoom position corresponding to the lower limit focal length of the common zoom range.

If it is judged that a zoom position adjustment should be performed for the next zoom position (S420: yes), a zoom position adjustment for the lens device 10B is performed for the next zoom position (S406-S418).

If it is judged that no zoom position adjustment should be performed for the next zoom position (S420: no), the zoom adjustment setting mode is finished. After initial settings such as reading of various other tables etc. necessary for 3D image taking are performed for the lens device 10A, and the lens device 10B, a transition is made to a 3D image operation mode.

Figure 5:
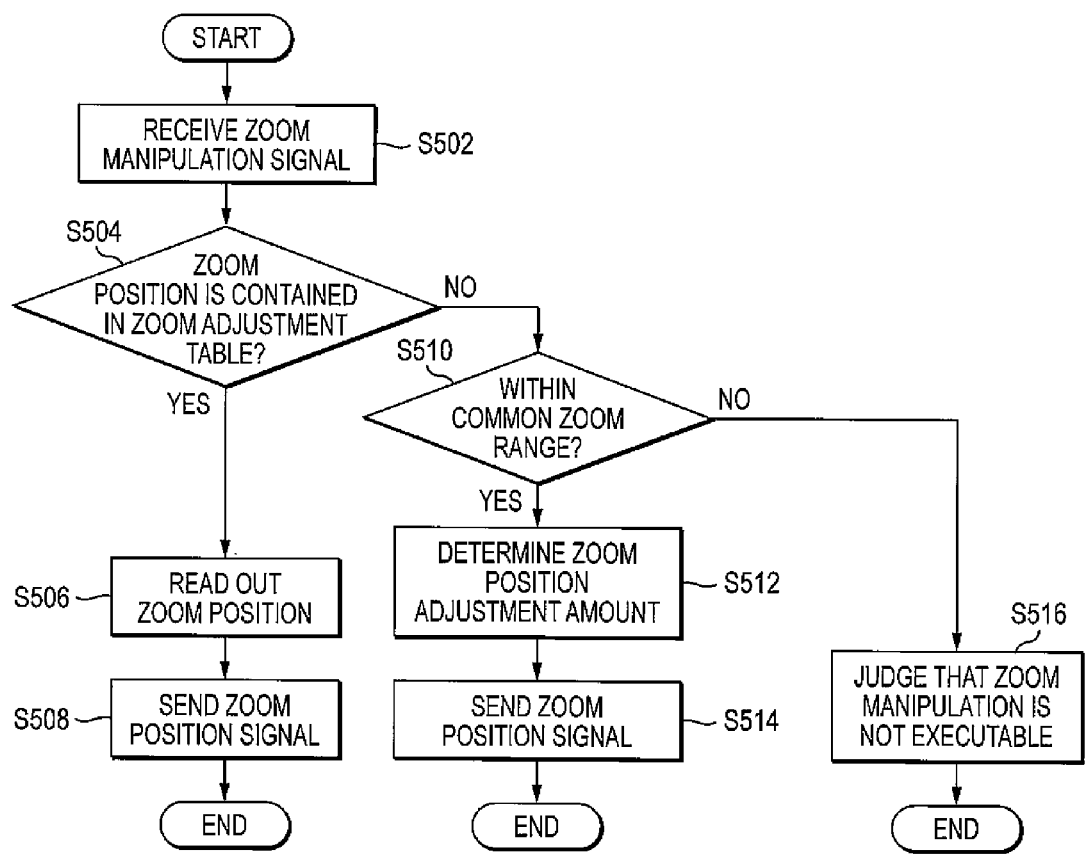
FIG. 5 is a flowchart of a zoom linkage control which is performed in a 3D image operation mode.
Figure 6:
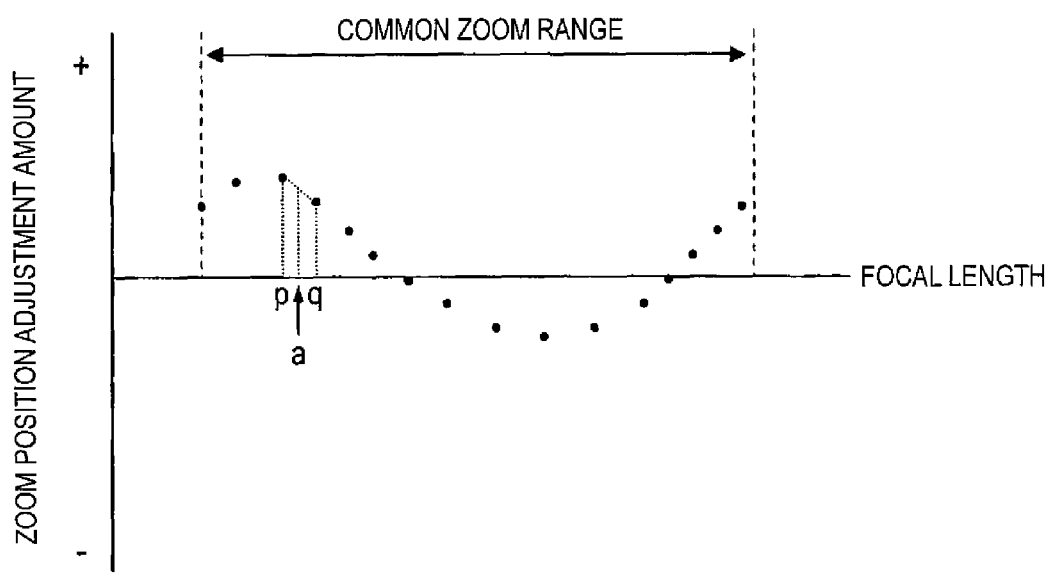
FIG. 6 is a drawing illustrating interpolation of a zoom adjustment table.

FIG. 5 is a flowchart of a zoom linkage control which is performed in the 3D image operation mode. FIG. 6 is a drawing illustrating interpolation of the zoom adjustment table.

First, the lens device 10A receives a zoom manipulation signal from the zoom controller 130 (S502). The lens device 10A generates a zoom position signal from a zoom position that is indicated by the received zoom manipulation signal.

Then, the lens device 10A judges whether or not the focal length indicated by the zoom manipulation signal is contained in the zoom adjustment table (S504).

If the focal length indicated by the zoom manipulation signal is contained in the zoom adjustment table (S504: yes), the lens device 10A reads out a zoom position adjustment amount for the lens device 10B that corresponds to this focal length (S506).

Then, the lens device 10A adds the zoom position adjustment amount to the zoom position signal generated at S502 and sends a resulting signal to the lens device 10B (S508).

If the focal length indicated by the zoom manipulation signal is not found in the zoom adjustment table (S504: no), the lens device 10A further judges whether or not this focal length is included in the common zoom range (S510).

If this focal length is not included in the common zoom range (S510: no), the process is finished without performing a zoom linkage control with a judgment that a 3D image cannot be taken on the basis of the zoom manipulation signal sent from the zoom controller 130 (S516). In this case, the user may be notified that the zoom manipulation that has been made on the zoom controller 130 is not executable.

On the other hand, if this focal length is included in the common zoom range (S510: yes), the lens device 10A determines a zoom position adjustment amount corresponding to the target focal length by interpolation using zoom position adjustment amounts at plural respective focal lengths contained in the zoom adjustment table (S512). For example, as shown in FIG. 6, if zoom position adjustment amounts at focal lengths p and q which are in the vicinities of a target focal length a are contained in the zoom adjustment table, a zoom position adjustment amount corresponding to the target focal length a can be determined by, for example, linear interpolation using the zoom position adjustment amounts at the focal lengths p and q.

The lens device 10A adds the zoom position adjustment amount determined at S512 to the zoom position signal generated at S502 and sends a resulting signal to the lens device 10B (S514).

With the above-described lens device 10A, the state of any of various existing lens devices 10B that are of different kinds than the lens device 10A is adjusted to a state of the latter. This makes it possible to take a 3D image with zoom positions equalized even in the case where the lens device 10A is combined with any of various existing lens devices 10B that are of different kinds than it.

Since the lens device 10A is given the zoom adjustment setting function, the lens device 10A and the lens device 10B can be used for taking of a 3D image immediately after the lens device 10B is again connected to the lens device 10A without the need for adjusting the lens device 10B again.

On the other hand, while the lens device 10B is not connected, a non-3D image can be taken using the lens device 10A. As such, the lens device 10A can be used differently depending on the situation.

Although the lens control device according to the invention has been described above in detail, it goes without saying that the invention is not limited to the above example and various improvements and modifications may be made without departing from the gist of the invention.

As described above, this specification discloses the following items:

(1) A lens control device which is incorporated in a first lens device for 3D image taking and controls the first lens device and a second lens device which is made usable for 3D image taking when connected to the first lens device, comprising a first zoom position sending unit for sending a zoom position signal indicating a zoom position of the first lens device to the second lens device; a second zoom position sending unit for sending an adjusted zoom position signal for zoom position adjustment of the second lens device to the second lens device; a zoom storage unit for storing zoom adjustment information in which a zoom position adjustment amount indicated by the adjusted zoom position signal is correlated with the zoom position of the first lens device; and a third zoom position sending unit for sending a zoom position signal for the second lens device on the basis of the zoom adjustment information in response to a zoom manipulation signal indicating a zoom manipulation on the first lens device.

(2) The lens control device according to item (1), further comprising a lens information receiving unit for receiving identification information that is specific to the second lens device, wherein the zoom storage unit stores the received identification information that is specific to the second lens device and the zoom adjustment information in such a manner that they are correlated with each other.

(3) The lens control device according to item (1) or (2), further comprising a zoom information acquiring unit for receiving a zoom movable range of the second lens device; and a zoom range acquiring unit for determining a common zoom range of a zoom movable range of the first lens device and the acquired zoom movable range of the second lens device.

(4) The lens control device according to any one of items (1) to (3), further comprising a zoom position interpolating unit for determining a zoom position adjustment amount of the second lens device through interpolation if the zoom adjustment information does not contain a zoom position adjustment amount corresponding to a zoom position indicated by the zoom manipulation signal.

(5) The lens control device according to item (4), wherein the zoom position interpolating unit determines a zoom position adjustment amount of the second lens device through linear interpolation (6) The lens control device according to any one of items (1) to (5), further comprising a connection detecting unit for detecting that the second lens device has been connected to the first lens device.

(7) The lens control device according to item (6), further comprising a mode switching unit for switching, according to whether the second lens device is connected or not, between a first operation mode in which an operation control for 3D image taking which uses the first lens device and the second lens device is performed and a second operation mode in which an operation control for image taking which uses only the first lens device is performed, wherein the mode switching unit makes switching from the second operation mode to the first operation mode if the connection detecting unit detects connection of the second lens device.

(8) A lens control method of a lens control device incorporated in a first lens device for 3D image taking, for controlling the first lens device and a second lens device which is made usable for 3D image taking when connected to the first lens device, comprising the steps of sending a zoom position signal indicating a zoom position of the first lens device to the second lens device; sending an adjusted zoom position signal for zoom position adjustment of the second lens device to the second lens device; storing zoom adjustment information in which a zoom position adjustment amount indicated by the adjusted zoom position signal is correlated with the zoom position of the first lens device; and sending a zoom position signal for the second lens device on the basis of the zoom adjustment information in response to a zoom manipulation signal indicating a zoom manipulation on the first lens device.

(9) A lens control device which is incorporated in a first lens device for 3D image taking and controls the first lens device and a second lens device which is made usable for 3D image taking when connected to the first lens device, comprising a communication unit for sending a zoom position signal for zoom driving of the second lens device to the second lens device; a storage unit for storing zoom adjustment information in which a zoom position adjustment amount for adjustment of a difference between the zoom position of the first lens device and a zoom position of the second lens device corresponding to a zoom position signal indicating the zoom position of the first lens device is correlated with the zoom position of the first lens device; and a control unit for driving zooming of the first lens device and sending a zoom position signal that has been adjusted on the basis of the zoom position of the first lens device using the zoom adjustment information to the second lens device through the communication unit, in response to a zoom manipulation signal that is input to the first lens device.

(10) The lens control device according to item (9), wherein the control unit sends, to the second lens device through the communication unit, an adjusted zoom position signal for driving zooming of the second lens device so that a difference between the zoom position of the first lens device and a zoom position of the second lens device corresponding to a zoom position signal indicating the zoom position of the first lens device is adjusted, and stores, in the storage unit, as the zoom position adjustment amount, a difference component, obtained when the difference has been adjusted, between the adjusted zoom position signal and the zoom position signal.

(11) The lens control device according to item (10), wherein before the adjustment of the difference between the zoom position of the first lens device and the zoom position of the second lens device corresponding to the zoom position signal indicating the zoom position of the first lens device, the control unit sends the zoom manipulation signal that is input to the first lens device, to the second lens device through the communication unit as the adjusted zoom position signal without driving zooming of the first lens device in response to the zoom manipulation signal.

INDUSTRIAL APPLICABILITY

According to the invention, the state of any of various existing lens devices that are of different kinds than a lens device designed for 3D image taking is adjusted to a state of the latter. This makes it possible to take a 3D image with zoom positions equalized even in the case where the lens device for 3D image taking is combined with any of various existing lens devices that are of different kinds than it.

Although the invention has been described in detail by referring to the particular embodiment, it is apparent to those skilled in the art that various changes and modifications are possible without departing from the spirit and scope of the invention.

DESCRIPTION OF SYMBOLS

1 . . . Camera system
2, 3, . . . Connection cable
10 . . . Lens system
10A, 10B . . . Lens device
100A, 100B . . . Camera main body

The invention claimed is:

1. A lens control device which is incorporated in a first lens device for 3D image taking and controls the first lens device and a second lens device which is made usable for 3D image taking when connected to the first lens device, comprising:
a first zoom position sending unit for sending a zoom position signal indicating a zoom position of the first lens device to the second lens device;
a second zoom position sending unit for sending an adjusted zoom position signal for zoom position adjustment of the second lens device to the second lens device;
a zoom storage unit for storing zoom adjustment information in which a zoom position adjustment amount indicated by the adjusted zoom position signal is correlated with the zoom position of the first lens device;
a third zoom position sending unit for sending a zoom position signal for the second lens device on the basis of the zoom adjustment information in response to a zoom manipulation signal indicating a zoom manipulation on the first lens device; and
a connection detecting unit for detecting that the second lens device has been connected to the first lens device.

2. The lens control device according to claim 1, further comprising:
a zoom information acquiring unit for receiving a zoom movable range of the second lens device; and
a zoom range acquiring unit for determining a common zoom range of a zoom movable range of the first lens device and the acquired zoom movable range of the second lens device.

3. The lens control device according to claim 1, further comprising a zoom position interpolating unit for determining a zoom position adjustment amount of the second lens device through interpolation if the zoom adjustment information does not contain a zoom position adjustment amount corresponding to a zoom position indicated by the zoom manipulation signal.

4. The lens control device according to claim 3, wherein the zoom position interpolating unit determines a zoom position adjustment amount of the second lens device through linear interpolation.

5. The lens control device according to claim 1, further comprising a mode switching unit for switching, according to whether the second lens device is connected or not, between a first operation mode in which an operation control for 3D image taking which uses the first lens device and the second lens device is performed and a second operation mode in which an operation control for image taking which uses only the first lens device is performed, wherein the mode switching unit makes switching from the second operation mode to the first operation mode if the connection detecting unit detects connection of the second lens device.

6. A lens control method of a lens control device incorporated in a first lens device for 3D image taking, for controlling the first lens device and a second lens device which is made usable for 3D image taking when connected to the first lens device, comprising:

sending a zoom position signal indicating a zoom position of the first lens device to the second lens device;

sending an adjusted zoom position signal for zoom position adjustment of the second lens device to the second lens device;

storing zoom adjustment information in which a zoom position adjustment amount indicated by the adjusted zoom position signal is correlated with the zoom position of the first lens device;

sending a zoom position signal for the second lens device on the basis of the zoom adjustment information in response to a zoom manipulation signal indicating a zoom manipulation on the first lens device; and detecting with a connection detecting unit that the second lens device has been connected to the first lens device.

7. The lens control device according to claim 1, wherein the lens control device is configured to determine of the second lens device is connected.

8. The lens control device according to claim 7, wherein the lens control device is configured to determine if the second lens device was connected before.

9. The lens control device according to claim 8, wherein if the lens control device is configured to determine if the second lens device was connected before, then a zoom adjustment table for the first and second lens devices is retrieved from a storage unit.

10. The lens control device according to claim 1, wherein the first lens device is configured to set a common zoom range by referring to the lens particulars tables of the respective lens devices.

11. The lens control device according to claim 1, wherein the first lens device is configured to determine whether the zoom position adjustment is necessary.

12. The lens control method according to claim 6, wherein the lens control device determines whether the second lens device is connected.

13. The lens control method according to claim 12, wherein the lens control device determines if the second lens device was connected before.

14. The lens control method according to claim 13, wherein if the lens control device determines if the second lens device was connected before, then a zoom adjustment table for the first and second lens devices is retrieved from a storage unit.

15. The lens control method according to claim 6, wherein the first lens device sets a common zoom range by referring to the lens particulars tables of the respective lens devices.

16. The lens control device according to claim 15, wherein the first lens device determines whether the zoom position adjustment is necessary.

* * * * *